United States Patent [19]
Janssen et al.

[11] 3,929,801
[45] Dec. 30, 1975

[54] 2-BENZIMIDAZOLINONES

[75] Inventors: Paul Adriaan Jan Janssen, Vosselaar; Ineke van Wijngaarden, Beerse; Willem Soudijn, Turnhout, all of Belgium

[73] Assignee: Janssen Pharmaceutica N.V., Beerse, Belgium

[22] Filed: Sept. 25, 1974

[21] Appl. No.: 515,136

Related U.S. Application Data

[60] Division of Ser. No. 417,702, Nov. 20, 1973, which is a continuation-in-part of Ser. No. 321,058, Jan. 4, 1973, abandoned.

[52] U.S. Cl...... 260/293.6; 260/293.58; 260/295 K; 424/267

[51] Int. Cl.$^2$...................................... C07D 401/04
[58] Field of Search...................... 260/293.6, 295 K

[56] References Cited
UNITED STATES PATENTS

| | | | |
|---|---|---|---|
| 3,196,157 | 7/1965 | Janssen | 260/294 |
| 3,345,364 | 10/1967 | Janssen | 260/240 |

*Primary Examiner*—G. Thomas Todd
*Attorney, Agent, or Firm*—Salvatore R. Conte

[57] ABSTRACT

The compounds, {1- 1-[2-(1,4-benzodioxan-2-yl)-2-hydroxyethyl]-4-piperidyl}-2-benzimidazolinones, useful as anti-hypertensive agents.

7 Claims, No Drawings

2-BENZIMIDAZOLINONES

CROSS REFERENCE TO RELATED APPLICATIONS:

This is a divisional application of my co-pending application Ser. No. 417,702, filed Nov. 20, 1973, which in turn is a continuation-in-part of application Ser. No. 321,058, filed Jan. 4, 1973 (now abandoned).

BACKGROUND OF THE INVENTION:

The prior art discloses certain 2-(1,4-benzodioxan-2-yl)-2-hydroxyethylamine derivatives, not having said (4-piperidyl)-2-benzimidazolinone group. Such compounds may be found in the following references:
J. Med. Chem., 13, 169 (1970); and
Jap. 72.35435 — Derw. Week, T 36 (1972), Pharm. p. 6.

DESCRIPTION OF THE INVENTION:

This invention relates to novel compounds, 1-{1-[2-(1,4-benzodioxan-2-yl)-2-hydroxyethyl]-4-piperidyl}-2-benzimidazolinones, which may be structurally represented by the formula

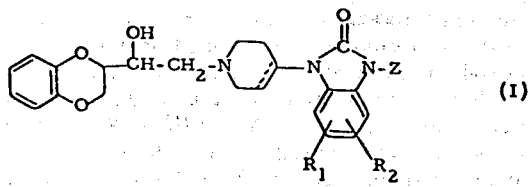

and the therapeutically active non-toxic acid addition salts thereof,
wherein:
Z is a member selected from the group consisting of hydrogen, loweralkyl, loweralkenyl, loweralkyloxy-loweralkyl, phenoxy-loweralkyl, loweralkylcarbonyl-loweralkyl, cyano-loweralkyl, phenyl-loweralkyl, hydroxy-loweralkyl, diloweralkylamino-loweralkyl, cyclic loweralkyleneamino-loweralkyl such as 1-pyrrolidinyl-loweralkyl and 1-piperidyl-loweralkyl; and loweralkyloxycarbonyl-loweralkyl;
$R_1$ and $R_2$ are each a member selected from the group consisting of hydrogen, halo and loweralkyl; and
the dotted line indicates an optional double bound.

As used herein "loweralkyl" represents straight or branch chained alkyl radicals having from 1 to 5 carbon atoms. "Loweralkenyl" is meaned to include straight and branch chained alkenylradicals having 3 to 5 carbon atoms. The term "halo" refers to halogens of atomic weight less than 127, i.e. chloro, bromo, fluoro and iodo.

The subject compounds (I) are prepared by reacting a halide, preferably the bromide, of formula (II) with the amine of formula (III). This condensation reaction is conveniently conducted in an inert organic solvent such as, for example, an aromatic hydrocarbon, e.g., benzene, toluene, xylene, and the like; lower alkanol, e.g., methanol, ethanol, n-butanol and the like; a ketone, e.g., 4-methyl-2-pentanone; an ether, e.g., dioxane, diethyl ether and the like; dimethylformamide (DMF); nitrobenzene; and the like. The addition of an appropriate base such as, for example, an alkali metal carbonate or bicarbonate, may be utilized to pick up the halogen acid that is liberated during the course of the reaction. Elevated temperatures may be employed to enhance the rate of reaction.

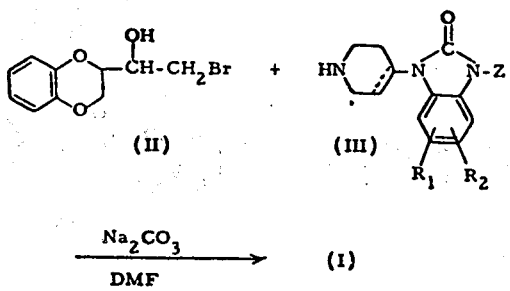

The compounds of formula (I) wherein Z is a substituent different from hydrogen, may also be obtained by introducing said Z in the corresponding (I) wherein Z is hydrogen by known methods as described hereinafter for the preparation of the 4-piperidylbenzimidazolinones and 4-(tetrahydropyridyl)benzimidazolinones of formula (III).

Alternatively the compounds of formula (I) are obtained by reacting (III) with 2-epoxyethyl-1,4-benzodioxane in a suitable organic solvent such as an aromatic hydrocarbon, for example, benzene, toluene, xylene and the like; a halogenated hydrocarbon, such as chloroform and methylene chloride; or a lower alkanol, such as, for example, methanol, ethanol, 2-propanol and the like and preferably in a mixture of an aromatic hydrocarbon and a lower alkanol. The reaction may be promoted by the addition of alkali.

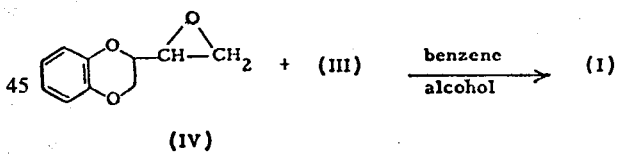

The compounds of formula (I), wherein Z is different from alkenyl and alkylcarbonyl alkyl, may also be prepared by the following reaction sequence. A compound of formula (III) is reacted with a reactive ester of benzodioxan-2-yl-hydroxymethyl ketone, for example the bromide of formula (V), in an appropriate organic solvent, such as, for example, a lower alkanol in the presence of a convenient acid acceptor, e.g., an amine such as diisopropylamine. The resulting ketone of formula (VI) is then reduced to the corresponding (I) by known methods such as for example, with metal hydrides, such as, sodium borohydride, sodium aluminumhydride, borane, diborane and the like, or with a metal, preferably an alkali metal in an appropriate solvent as known in the art.

The foregoing reactions are illustrated in the following scheme:

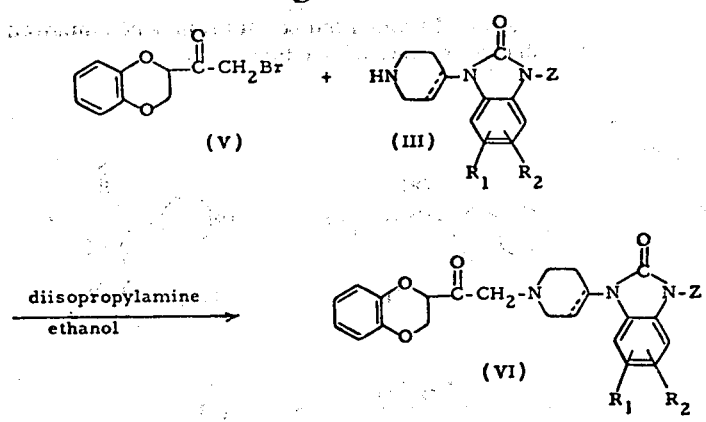

(I)

The compounds of formula (I) having a saturated piperidinering (I-b) may also be obtained by reacting a 4-(o-nitroanilino)piperidine (VII) with a halide of formula (II) or with 2-epoxy-1,4-benzodioxane by conventional methods as previously defined, reducing the nitro-group to amine for example, by catalytic hydrogenation and then effecting ring closure by methodologies known in the art, such as, for example, by heating with urea. The thus-obtained compounds of formula (I-a) may then be substituted in the 3-position of the benzimidazolinone-moiety with a substituent Z, different from hydrogen, by known alkylating procedures, yielding (I-b).

The same compounds may be obtained by the following procedures. A reactive ester of 1,4-benzodioxan-2-yl-hydroxymethyl ketone: e.g., the bromide of formula (V) is reacted with a compound of formula (VII) under appropriate conditions, such as, usually employed in N-alkylations. The keto-function of the resulting compound (X) may be reduced to the alcohol (VIII) for example, with a di-light metal hydride, such as sodium borohydride, sodium aluminumhydride and the like. The reduction of the keto-group may be carried out before (X → VIII → IX) or after (X → XI → IX) the reduction of the nitro-function to amine or simultaneously (X → IX) when an appropriate reducing agent such as lithium aluminumhydride is employed.

The foregoing reactions are schematically illustrated as follows:

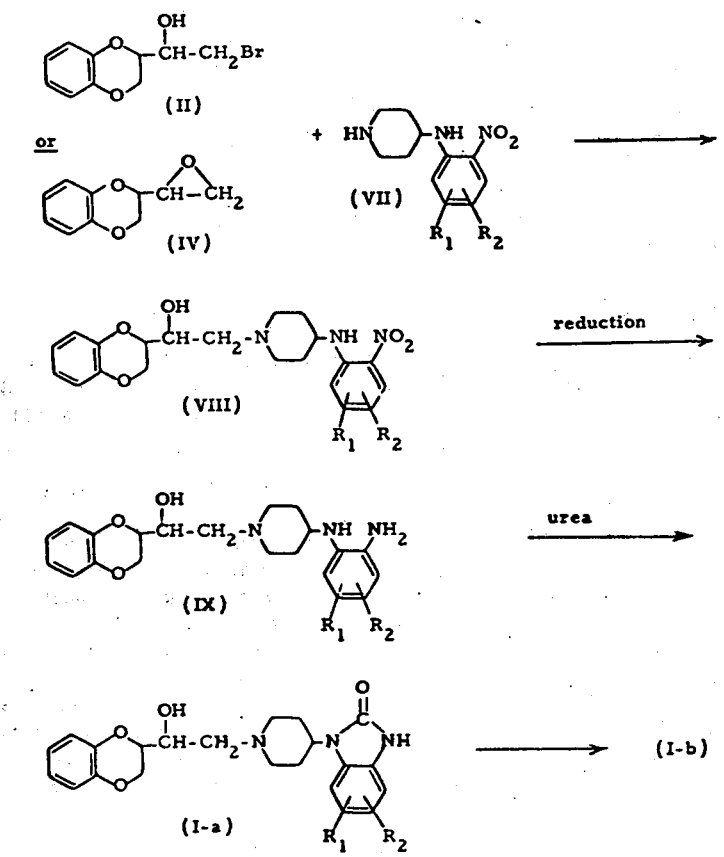

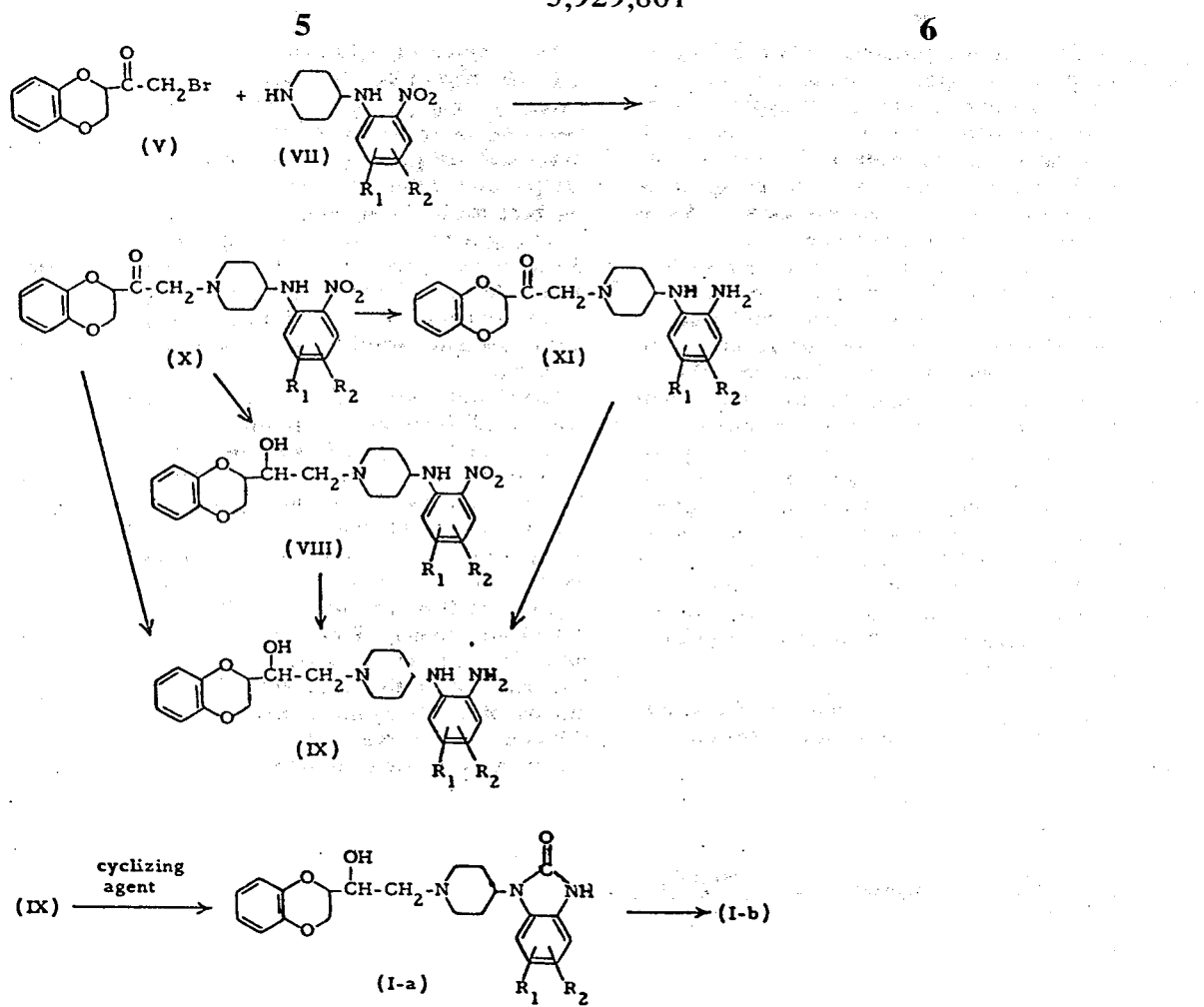

Yet another method for the preparation of the compounds (I-b) consists in reacting (II) with a benzyl-substituted compound of formula (XII) to form a quaternary ammonium salt. Quaternisation may be achieved for example, by heating the reactants in an appropriate solvent, such as acetonitrile. The desired compounds of formula (I-b) are then obtained by debenzylation of (XIII), for example by catalytic hydrogenation using palladium-on-charcoal catalyst.

The starting materials of formulas (II), (IV) and (V) are known. The 1-(4-piperidyl)-2-benzimidazolinones and 1-(1,2,3,6-tetrahydro-4-pyridyl)-2-benzimidazolinones of formula (III), a number of which are also known, may be prepared by methods known in the art. Such compounds and methods for preparing same may be found in U.S. Pat. Nos. 3,161,645 and 3,196,157.

The 1-(4-piperidyl)-2-benzimidazolinones of formula (III) wherein Z is hydrogen, may for example be pre-

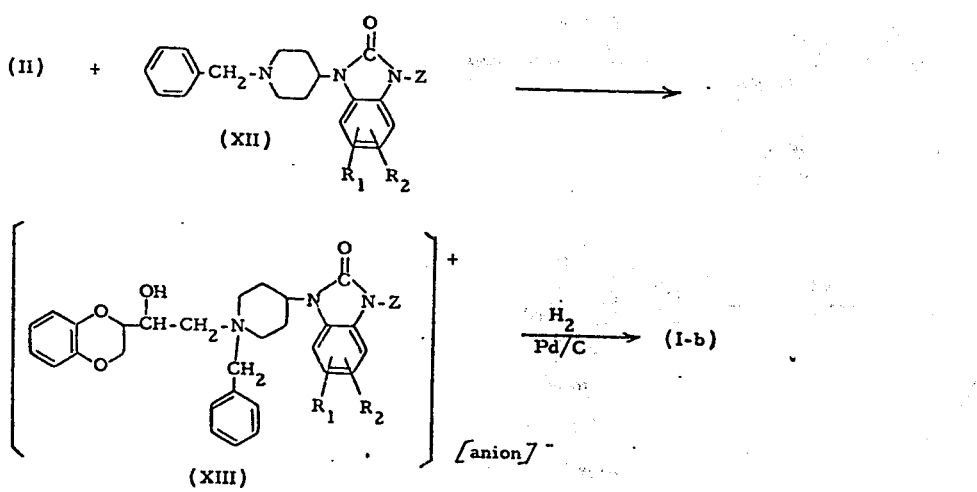

pared as follows. A 4-piperidone (XIV), having an appropriate protecting group, such as carbethoxy or benzyl, in the 1-position, is reacted with hydroxylamine whereby the corresponding oxime (XV) is obtained, which, by catalytic hydrogenation, for example on Raney-nickel catalyst, yields the 4-aminopiperidine derivative of formula (XVI). The compound (XVI) is then reacted with an appropriate o-nitrohalobenzene of formula (XVII) in a suitable organic solvent, such as for example, cyclohexanol, in the presence of an acid acceptor, such as for example a metal carbonate or bicarbonate. The reaction may be stimulated by the addition of a small amount of an iodide, preferably an alkali or earth alkali metal iodide. The nitro function of the resulting 4-anilinopiperidine is then reduced to an amino function for example by catalytic hydrogenation, e.g., using Raney-nickel catalyst. Ring closure is then effected by heating (XIX) with an appropriate cyclizing agent, such as urea, potassium isocyanate, phosgene and the like. The corresponding compounds of formula (III-a) are obtained after removing the protecting group by conventional means such as catalytic debenzylation or alkaline hydrolysis when the protecting group is carbethoxy.

The foregoing reactions are illustrated in the following scheme wherein carbethoxy stands for the protecting group:

The compounds of formula (III) wherein Z is a substituent different from hydrogen, are conveniently prepared by the introduction of said Z into a 1-(4-piperidyl)-2-benzimidazolinone or a 1-(1,2,3,6-tetrahydro-4-pyridyl)-2-benzimidazolinone having a hydrogen atom on the nitrogen atom in the 3-position of the benzimidazolinone moiety and an appropriate protecting group Q such as, for example, benzyl or carbethoxy in the 1-position of the piperidine or tetrahydropyridine ring. The protecting group is then removed by conventional methods such as catalytic debenzylation or alkaline hydrolysis when the protecting group is carbethoxy.

The introduction of Z may be effected generally by reacting (XXI) wherein Q is the protecting group with a compound XZ (XXII) wherein Z is as previously defined and X is a reactive ester of the corresponding alcohol, such as for example, a halide, mesylate or tosylate. The reaction is carried out in the presence of an appropriate base such as sodium amide, sodium hydride and the like, in an appropriate organic solvent, e.g., hexamethylphosphoramide, dimethylsulfoxide and dimethylformamide. When said Z stands for hydroxyloweralkyl it is advantageous to protect the hydroxyl-function prior to the reaction for example, by the formation of a tetrahydropyranyl ether. The alcohol is subsequently set free by known methods, such as by treatment with p-toluenesulfonic acid in alcohol.

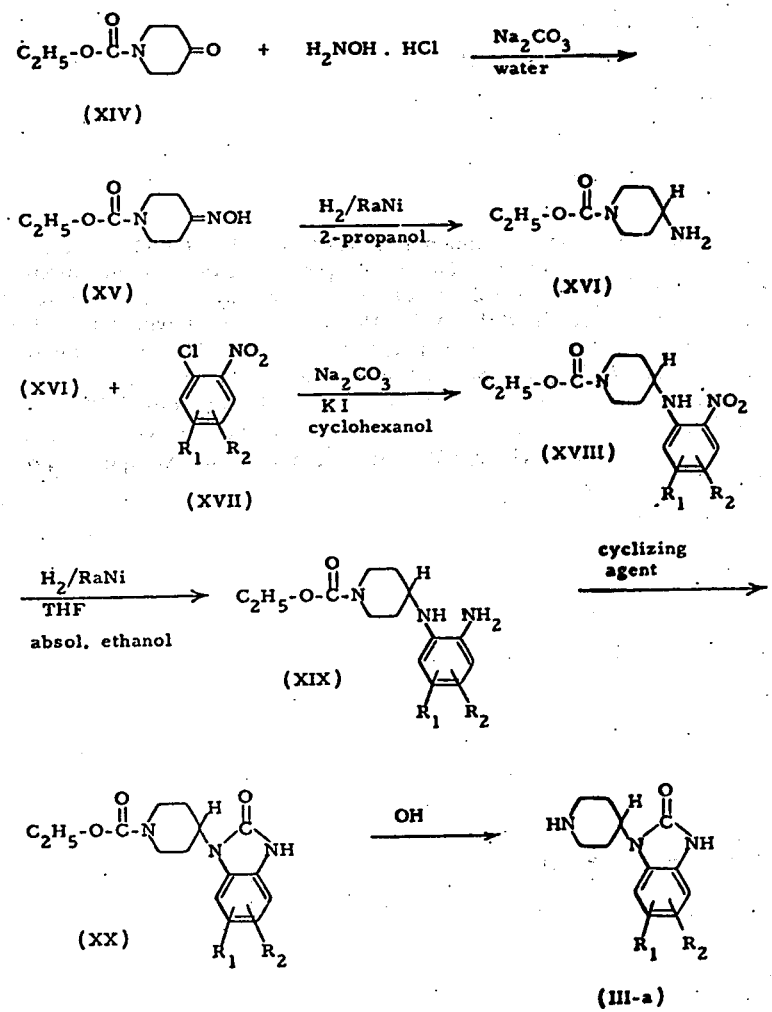

When Z stands for hydroxymethyl, hydroxymethylation may be carried out using conventional hydroxymethylating agents, such as formaldehyde.

The compounds wherein Z stands for cyanoethyl, loweralkoxycarbonylethyl and phenethyl, may alternatively be prepared by reacting (XXI) with an unsaturated compound of formula (XXIV), wherein Y is cyano, loweralkoxycarbonyl or phenyl. Said condensation reaction may conveniently be carried out in a reaction inert organic solvent, such as, for example, aromatic hydrocarbons, such as benzene, toluene, xylene and the like; ethers such as dimethyl ether, diethyl ether, diisopropylether, tetrahydrofuran, dioxane and the like and in halogenated hydrocarbons, such as chloroform, methylene chloride and the like, in the presence of an appropriate dispersing agent, e.g. Triton B.

Compounds of formula (III) wherein Z stands for loweralkylcarbonylmethyl may be prepared alternatively by reacting (XXI) with a reactive ester of an appropriate alkynyl alcohol, followed by treatment of the thus-obtained (XXIII-b) with alkali, whereby the ketone derivative (XXIII-c) is obtained. From the compounds (XXIII-a) and (XXIII-c) obtained by the foregoing procedures, the protecting group may be removed by conventional methods as described herebefore.

The foregoing reactions are illustrated in the following scheme:

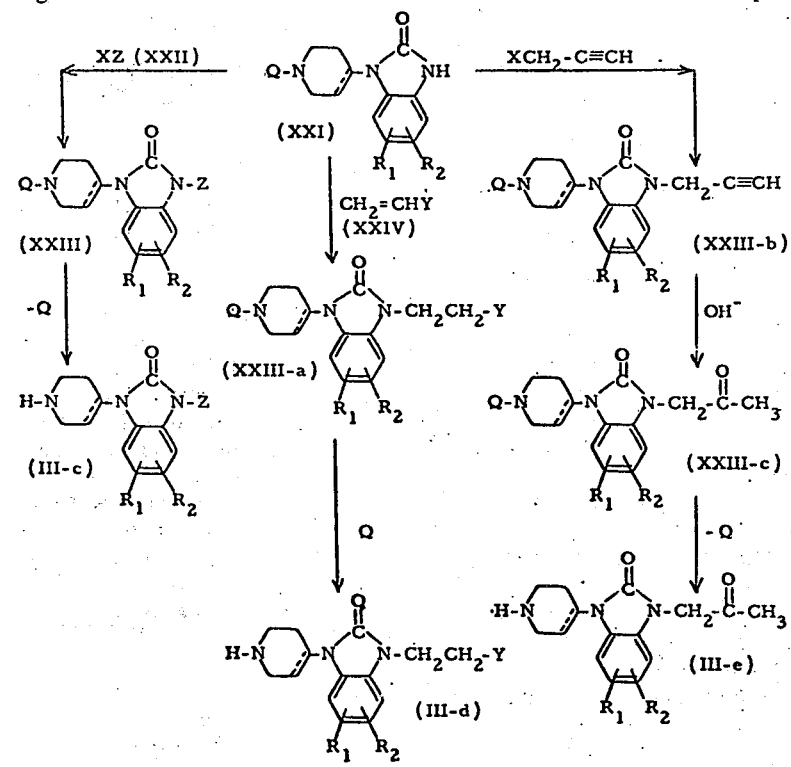

The intermediates of formula (VII) are conveniently prepared by alkaline hydrolysis of (XVIII) whereby the protecting carbethoxy-group is removed.

The novel compounds of formula (III-b) may be described by the formula:

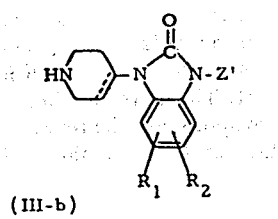

(III-b)

wherein:
Z' is a member selected from the group consisting of lower alkenyl, phenoxy-loweralkyl, phenyl-loweralkyl, di-loweralkyl-aminoloweralkyl and cyclic loweralkyleneamino-loweralkyl such as 1-pyrrondinyl-loweralyl and 1-piperidyl-loweralkyl;
$R_1$ and $R_2$ are each a member selected from the group consisting of hydrogen, halo and loweralkyl; and
the dotted line indicates an optional double bond.

In view of their utility as precursors in the synthesis described herein, such compounds of formula (III-b) are deemed to be an additional feature of this invention.

The subject compound (I) may be converted to the therapeutically active non-toxic acid addition salt form by treatment with an appropriate acid, such as, for example, an inorganic acid, such as hydrohalic acid, e.g., hydrochloric, hydrobromic, and the like, and sulfonic acid, nitric acid, phosphoric acid and the like; or an organic acid, such as, for example, acetic, propionic, glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfamic, salicylic, p-aminosalicylic and the like acids. Conversely, the salt form can be converted by treatment with alkali into the free base form.

The compounds of formula (I) and said acid addition salts have been found to possess marked blood pressure lowering activity. Said activity was determined by the following procedure. Dogs were anesthetized with sodium pentobarbital (30 mg/kg i.p.). The arterial blood pressure was measured via an indwelling catheter, connected with an electronic pressure transducer. After the initial control blood pressure was measured, the test compound was injected suboccipitally at dose levels of 2.5 and/or 10 mg/kg body weight.

The results are illustrated in the following table. For each compound listed, the drop in blood pressure, occuring between 30 and 60 minutes after injection, is expressed in mm. Hg.

It is understood that the compounds shown in the table are not listed for purposes of limiting the invention thereto, but only to exemplify the useful antihypertensive properties of all the compounds within the scope of formula (I).

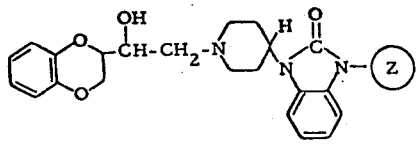

| (Z) | blood pressure lowering effect | |
|---|---|---|
| | at 2.5 μg per kg. s.o.[r] (in mm. Hg) | at 10 μg per kg. s.o.[r] (in mm. Hg) |
| H | −21 | — |
| H (erythro) | −30 | −20 |
| $CH_3$ | −48 | −42 |
| $CH_3$ (erythro) | −33 | −35 |
| $CH_3$ (threo) | −15 | — |
| $C_2H_5$ | −42 | −36 |
| $nC_4H_9$ | −12 | −39 |
| $iC_3H_7$ | −6 | −24 |
| $-CH_2-CH=CH_2$ | −6 | −54 |
| $-CH_2-C_6H_5$ | −24 | — |
| $-CH_2-O-CH_3$ | −36 | — |
| $-CH_2-CH_2-O-CH_3$ | −57 | — |
| $-CH_2-CH_2-O-C_6H_5$ | −12 | −27 |
| $-CH_2-COCH_3$ | −57 | — |
| $-CH_2-CH_2OH$ | −30 | — |
| $-CH_2-CH_2-COOCH_3$ | −36 | — |
| $-CH_2-CH_2-CN$ | −30 | — |
| (piperidyl-benzimidazolinone with Cl) | — | −12 |
| (tetrahydropyridyl-benzimidazolinone) | — | −25 |

[r]s.o. = suboccipital.

It is obvious from formula (I) that the compounds of this invention have two asymmetric carbon atoms, and consequently they may exist under different stereochemical optical isomeric forms. Said isomeric forms, which may be obtained separately from methodologies known in the art, are naturally intended to be within the scope of the invention.

The diastereoisomeric racemates, denoted as erythro and threo, may be obtained separately, for example, by selective crystallization, by counter-current-distribution or by the unambiguous preparation of the desired form of (I) starting from the adequate form of (II). Said racemates may be further resolved into their optical enantiomers by methods known in the art, such as, by salt formation with optically active acids. Typical such isomeric compounds are the following:

Erythro (±)-1-{1-[2-(1,4-benzodioxan-2-yl)-2-hydroxyethyl]-4-piperidyl}-2-benzimidazolinone.

Threo (±)-1-{1-[2-(1,4-benzodioxan-2-yl)-2-hydroxyethyl]-4-piperidyl}-2-benzimidazolinone cyclohexanesulfamate.

Erythro (±)-1-{1-[2-(1,4-benzodioxan-2-yl)-2-hydroxyethyl]-4-piperidyl}-2-benzimidazolinone.

Erythro (−)-1-{1-[2-(1,4-benzodioxan-2-yl)-2-hydroxyethyl]-4-piperidyl}-2-benzimidazolinone.

Threo (+)-1-{1-[2-(1,4-benzodioxan-2-yl)-2-hydroxyethyl]-4-piperidyl}-2-benzimidazolinone.

Threo (+)-1-{1-[2-(1,4-benzodioxan-2-yl)-2-hydroxyethyl]-4-piperidyl}-2-benzimidazolinone.

Erythro (±)-1-{1-[2-(1,4-benzodioxan-2-yl)-2-hydroxyethyl]-4-piperidyl}-3-methyl-2-benzimidazolinone hydrochloride.

Threo (±)-1-{1-[2-(1,4-benzodioxan-2-yl)-2-hydroxyethyl]-4-piperidyl}-3-methyl-2-benzimidazolinone hydrochloride.

Erythro (+)-1-{1-[2-(1,4-benzodioxan-2-yl)-2-hydroxyethyl]-4-piperidyl}-3-methyl-2-benzimidazolinone hydrochloride.

Erythro (−)-1-{1-[2-(1,4-benzodioxan-2-yl)-2-hydroxyethyl]-4-piperidyl}-3-methyl-2-benzimidazolinone hydrochloride.

Threo (+)-1-{1-[2-(1,4-benzodioxan-2-yl)-2-hydroxyethyl]-4-piperidyl}-3-methyl-2-benzimidazolinone hydrochloride.

Threo (−)-1-{1-[2-(1,4-benzodioxan-2-yl)-2-hydroxyethyl]-4-piperidyl}-3-methyl-2-benzimidazolinone hydrochloride.

The following examples are intended to illustrate, and not to limit the scope of the present invention. Unless otherwise stated, all parts are by weight.

EXAMPLE I

A mixture of 1.04 parts of α-bromomethyl-1,4-benzodioxan-2-methanol, 0.785 parts of 1-(4-piperidyl)-2-benzimidazolinone, 0.64 parts of sodium carbonate and 6 parts of dimethylformamide is stirred overnight (about 16 hours) at 100°C. The reaction mixture is cooled and diluted with water. The precipitated product, 1-{1-[2-(1,4-benzodioxan-2-yl)-2-hydroxyethyl]-4-piperidyl}-2-benzimidazolinone, is washed with water and taken up in acetone. The whole is filtered and to the acetone-solution is added a solution of cyclohexanesulfamic acid in acetone. The precipitated product is filtered off and crystallized from hot acetone. After cooling, the product is filtered off again, washed with acetone and dried at 50°C, yielding 1-{1-[2-(1,4-benzodioxan-2-yl)-2-hydroxyethyl]-4-piperidyl}-2-benzimidazolinone cyclohexanesulfamate; mp. 176°–180°C.

EXAMPLE II

A mixture of 2.1 parts of α-(bromomethyl)-1,4-benzodioxan-2-methanol, 1.74 parts of 1-(4-piperidyl)-2-benzimidazolinone, 1.77 parts of sodium carbonate and 12 parts of dry dimethyl formamide is heated overnight at 100°–110°C while stirring. The reaction mixture is cooled, filtered over hyflo and the filtrate is stirred for 1 hour after the addition of water. The separated oily product is extracted with chloroform. The extract is washed with water, dried, filtered and evaporated. The residue is purified by column-chromatography over silicagel, using a mixture of chloroform and 10% of methanol as eluent. The pure fractions are collected and the eluent is evaporated. The residue is crystallized from ethyl acetate at 0°C, yielding, after drying in vacuo at 70°C, erythro (±)-1-{1-[2-(1,4-benzodioxan-2-yl)-2-hydroxyethyl]-4-piperidyl}-2-benzimidazolinone; mp. 188.8°C.

EXAMPLE III

To a stirred mixture of 40 parts of water, 1.7 parts of ethyl 4-oxo-1-piperidinecarboxylate and 1.28 parts of sodium carbonate is added dropwise first 0.72 parts of hydroxylamine hydrochloride, followed by the addition of 20 parts of water. The whole is stirred for 24 hours. The precipitated product is filtered off and taken up in 60 parts of chloroform. The whole is filtered and the filtrate is extracted twice with chloroform. The combined chloroform extracts are dried over potassium carbonate and evaporated. The residue is crystallized from diisopropylether, yielding ethyl 4-hydroxyimino-1-piperidinecarboxylate; mp. 79–81.6°C.

A mixture of 18.6 parts of ethyl 4-hydroxyimino-1-piperidinecarboxylate and 720 parts of 2-propanol is hydrogenated at normal pressure and at a temperature of 40°C, in the presence of 5 parts of Raney-nickel as catalyst. After the calculated amount of hydrogen is ttaken up, hydrogenation is stopped. The catalyst is filtered off and the filtrate is evaporated. The residue is dissolved in 40 parts of 2-propanol. This solution is acidified with a saturated solution of 2-propanol/hydrochloric acid. The precipitated product is filtered off and dried, yielding ethyl 4-amino-1-piperidinecarboxylate hydrochloride; mp. 213.4°–215°C.

A mixture of 43 parts of ethyl 4-amino-1-piperidinecarboxylate, 57.6 parts of 1,4-dichloro-2-nitrobenzene, 32 parts of sodium carbonate, 0.2 parts of potassium iodide and 160 parts of cyclohexanol is stirred and heated at 150°C. for 40 hours. The reaction mixture is cooled and shaken with toluene and water. The layers are separated. The organic layer is washed three times with water, dried, filtered and evaporated. The oily residue is dissolved in hot diisopropylether. The latter solution is stirred and refluxed with activated charcoal. The charcoal is filtered off and the filtrate is allowed to crystallize. The precipitated product is filtered off and dried, yielding ethyl 4-(4-chloro-2-nitroanilino)-1-piperidinecarboxylate; mp. 116°C.

A mixture of 59 parts of ethyl 4-(4-chloro-2-nitroanilino)-1-piperidinercarboxylate, 270 parts of tetrahydrofuran and 96 parts of absolute ethanol is hydrogenated at normal pressure and at room temperature with 15 parts of Raney-Nickel as catalyst. Ater the calculated amount of hydrogen is taken up, hydrogenation is stopped. The catalyst is filtered off and the filtrate is evaporated, yielding ethyl 4-(2-amino-4-chloroanilino)-1-piperidinecarboxylate; mp. 150°C.

A mixture of 24.7 parts of ethyl 4-(2-amino-4-chloroanilino)-1-piperidinecarboxylate and 7.2 parts of urea is heated in an oil-bath at 160°–180°C for 3h.30. The melt is taken up in 240 parts of toluene and stirred and heated till all solid enters solution. The solution is stirred with activated charcoal, filtered and the filtrate is concentrated to about 50 parts. Upon the addition of diisopropylether, the product is separated as an oil. The latter solidifies while stirring. The solid product is filtered off and dried, yielding ethyl 4-(5-chloro-2-oxo-1-benzimidazolinyl)-1-piperidinecarboxylate; mp. 160°C.

A mixture of 22.3 parts of ethyl 4-(5-chloro-2-oxo-1-benzimidazolinyl)-1-piperidinecarboxylate, 13 parts of sodium hydroxide solution 50% and 90 parts of water is stirred and refluxed for 24 hours. The resulting solution is cooled and stirred for 30 minutes with 8.5 parts of ammonium chloride. The product is extracted with chloroform: the undissolved part is filtered off and discarded. The chloroform layer is separated, dried, filtered and evaporated. The oily residue solidifies on triturating in 4-methyl-2-pentanone. The solid product is filtered off and dried, yielding 5-chloro-1-(4-piperidyl)-2-benzimidazolinone; mp. 220°C.

A mixture of 4.2 parts of 2-(epoxyethyl)-1,4-benzodioxane, 3.8 parts of 5-chloro-1-(4-piperidyl)-2-benzimidazolinone, 14.4 parts of benzene and 2.4 parts of methanol is stirred and refluxed for 5 hours. The reaction mixture is evaporated. The oily residue is crystallized from ethanol. The product is filtered off, yielding 1-{1-[2-(1,4-benzodioxan-2-yl)-2-hydroxyethyl]-4-piperidyl}-5-chloro-2-benzimidazolinone hemihydrate; mp. 240°C (dec.).

EXAMPLE IV

A mixture of 2.85 parts of 2-(epoxyethyl)-1,4-benzodioxane, 3 parts of 1-methyl-3-(4-piperidyl)-2-benzimidazolinone, 13.5 parts of benzene and 2.4 parts of methanol is stirred and refluxed for 2 hours. The reaction mixture is evaporated. The residue is converted into the hydrochloride salt in a mixture of 2-propanol and diisopropylether. The salt is filtered off and crystallized from a mixture of 2-propanol and ethanol, yielding 1-{1-[2-(1,4-benzodioxan-2-yl)-2-hydroxyethyl]-4-piperidyl}-3-methyl-2-benzimidazolinone hydrochloride; mp. 250.3°C.

EXAMPLE V

To a stirred mixture of 1.9 parts of sodium hydride dispersion 73% in 80 parts of hexamethylphosphoramide are added portionwise 14.5 parts of ethyl 4-(2-oxo-1-benzimidazolinyl)-1-piperidinecarboxylate (exothermic reaction: temperature rises to 40°C.). Upon completion, stirring at 40°C is continued for 1 hour. Then there are added dropwise 8.6 parts of ethyl iodide and the whole is stirred overnight at 60°C. The reaction mixture is cooled, poured onto water and the product is extracted with toluene. The extract is dried, filtered and evaporated, yielding ethyl 4-(3-ethyl-2-oxo-1-benzimidazolinyl)-1-piperidinecarboxylate as an oily residue.

A mixture of 15.8 parts of ethyl 4-(3-ethyl-2-oxo-1-benzimidazolinyl)-1-piperidinecarboxylate, 20 parts of potassium hydroxide, 128 parts of 2-propanol and 2.5 parts of water is stirred and refluxed for 20 hours. 300 parts of water are added and the 2-propanol is evaporated. The product is extracted with chloroform. The extract is washed with water, dried, filtered and evaporated. The residue is crystallized from diisopropylether, yielding 1-ethyl-3-(4-piperidyl)-2-benzimidazolinone; mp. 142.3°C.

A mixture of 2.85 parts of 2-(epoxyethyl)-1,4-benzodioxane, 3.4 parts of 1-ethyl-3-(4-piperidyl)-2-benzimidazolinone, 13.5 parts of benzene and 2.4 parts of methanol is stirred and refluxed for 3 hours. The reaction mixture is evaporated. The residue is converted into the hydrochloride salt in a mixture of 2-propanol and diisopropylether. The salt is filtered off and crystallized from a mixture of 2-propanol and ethanol, yielding 1-{1-[2-(1,4-benzodioxan-2-yl)-2-hydroxyethyl]-4-piperidyl}-3-ethyl-2-benzimidazolinone hydrochloride; mp. 250.3°C.

EXAMPLE VI

A mixture of 14.5 parts of ethyl 4-(2-oxo-1-benzimidazolinyl)-1-piperidinecarboxylate, 1.9 parts of sodium hydride dispersion 73% and 80 parts of hexamethylphosphoramide is stirrred and heated at 50°C for 1 hour. After cooling to 20°C, 8.2 parts of n-butyl bromide are added dropwise. Upon completion, stirring is continued at about 65°C overnight. The reaction mixture is cooled, poured onto water and the product is extracted with toluene. The extract is dried, filtered and evaporated, yielding ethyl 4-(3-butyl-2-oxo-1-benzimidazolinyl)-1-piperidinecarboxylate as a residue.

A mixture of 17 parts of ethyl 4-(3-butyl-2-oxo-1-benzimidazolinyl)-1-piperidinecarboxylate, 20 parts of potassium hydroxide, 128 parts of 2-propanol and 2.5 parts of water is stirred and refluxed for 20 hours. The reaction mixture is cooled and 300 parts of water are added. The solvent is removed in vacuo and the product is extracted with chloroform. The extract is dried, filtered and evaporated. The residue is converted into the hydrochloride salt in 2-propanol and diisopropylether, yielding 1-butyl-3-(4-piperidyl)-2-benzimidazolinone hydrochloride; mp. 180°C.

A mixture of 3 parts of 2-(epoxyethyl)-1,4-benzodioxane, 4.1 parts of 1-butyl-3-(4-piperidyl)-2-benzimidazolinone, 12 parts of benzene and 2.4 parts of methanol is stirred and refluxed for 5 hours. The reaction mixture is evaporated. The residue is converted into the hydrochloride salt in 2-propanol and diisopropylether. The salt is filtered off and crystallized from a mixture of 2-propanol and ethanol, yielding 1-{1-[2-(1,4-benzodioxan-2-yl)-2-hydroxyethyl]-4-piperidyl}-3-butyl-2-benzimidazolinone hydrochloride; mp. 241.9°C.

EXAMPLE VII

A mixture of 29 parts of ethyl 4-(2-oxo-1-benzimidazolinyl)-1-piperidinecarboxylate, 3.8 parts of sodium hydride dispersion 73% and 160 parts of hexamethylphosphoramide is stirred for 1 hour at 50°C. After cooling to 20°C, there are added dropwise 18.5 parts of 2-bromopropane. Upon completion, stirring is continued overnight at 70°C. The reaction mixture is cooled, poured onto water and the product is extracted with toluene. The extract is dried, filtered and evaporated, yielding ethyl 4-(3-isopropyl-2-oxo-1-benzimidazolinyl)-1-piperidinecarboxylate as a residue.

A mixture of 30 parts of ethyl 4-(3-isopropyl-2-oxo 1-benzimidazolinyl)-1-piperidinecarboxylate, 40 parts of potassium hydroxide, 240 parts of 2-propanol and 5 parts of water is stirred and refluxed for 20 hours. The reaction mixture is cooled, 300 parts of water are added and the 2-propanol is evaporated. The residue is extracted with chloroform. The extract is dried, filtered and evaporated. The residue is crystallized from diisopropylether, yielding 1-isopropyl-3-(4-piperidyl)-2-benzimidazolinone, mp. 112.3°C.

A mixture of 3 parts of 2-(epoxyethyl)-1,4-benzodioxane, 3.9 parts of 1-isopropyl-3-(4-piperidyl)-2-benzimidazolinone, 12 parts of benzene and 2.4 parts of methanol is stirred and refluxed for 6 hours. The reaction mixture is evaporated. The residue is converted into the hydrochloride salt in 2-propanol and diisopropylether. The salt is filtered off and crystallized from a mixture of 2-propanol and ethanol, yielding 1-{1-[2 (1,4-benzodioxan-2-yl)-2-hydroxyethyl]-4-piperidyl}-3-isopropyl-2-benzimidazolinone hydrochloride; mp. 245.8°C.

EXAMPLE VIII

A mixture of 14.5 parts of ethyl 4-(2-oxo-1-benzimidazolinyl)-1-piperidinecarboxylate, 1.9 parts of sodium hydride dispersion 73% and 100 parts of hexamethylphosphoramide is stirred for one hour at 60°C. The mixture is cooled and there are added dropwise 6.7 parts of allyl bromide. Upon completion, stirring is continued for 24 hours at 80°C. The reaction mixture is cooled, poured onto water and the product is extracted with toluene. The extract is dried, filtered and evaporated, yielding ethyl 4-(3-allyl-2-oxo-1-benzimidazolinyl)-1-piperidinecarboxylate as an oily residue.

A mixture of 16.5 parts of ethyl 4-(3-allyl-2-oxo-1-benzimidazolinyl)-1-piperidinecarboxylate, 20 parts of potassium hydroxide, 128 parts of 2-propanol and 2.5 parts of water is stirred and refluxed for 20 hours. 300 parts of water are added and the 2-propanol is removed in vacuo. The product is extracted with chloroform. The extract is washed with water, dried, filtered and evaporated. The residue is converted into the hydrochloride salt in diisopropylether and 2-propanol. The salt is filtered off and crystallized from a mixture of 2-propanol and ethanol, yielding 1-allyl-3-(4-piperidyl)-2-benzimidazolinone hydrochloride; mp. 264.8°C.

A mixture of 2.85 parts of 2-(epoxyethyl)-1,4-benzodioxane, 3.6 parts of 1-allyl-3-(4-piperidyl)-2-benzimidazolinone, 12 parts of benzene and 2.4 parts of methanol is stirred and refluxed for 3 hours. The reaction mixture is evaporated. The residue is converted into the hydrochloride salt in 2-propanol and diisopropylether. The crude salt is filtered off and crystallized from 2-propanol, yielding 1-allyl-3-{1-[2-(1,4-benzodioxan-2-yl)-2-hydroxyethyl]-4-piperidyl}-2-benzimidazolinone hydrochloride; mp. 220.2°C.

EXAMPLE IX

A mixture of 14.5 parts of ethyl 4-(2-oxo-1-benzimidazolinyl)-1-piperidinecarboxylate, 1.9 parts of sodium hydride dispersion 73% and 100 parts of hexamethylphosphoramide is stirred for 1 hour at 60°C. After cooling to 20°C., 3.6 parts of chloromethyl ether are added dropwise and the whole is stirred overnight at 50°C. Then another 2 parts of chloromethyl ether are added and stirring is continued at 80°C for 6 hours. The reaction mixture is cooled, poured onto ice-water and the product is extracted with toluene. The extract is washed with water, dried, filtered and evaporated. The residue is crystallized from diisopropylether, yielding ethyl 4-[3-(methoxymethyl)-2-oxo-1-benzimidazolinyl]-1-piperidinecarboxylate; mp. 90°C.

A mixture of 10.5 parts of ethyl 4-[3-(methoxymethyl)-2-oxo-1-benzimidazolinyl]-1-piperidinecarboxylate, 20 parts of potassium hydroxide, 128 parts of 2-propanol and 2.5 parts of water is stirred and refluxed for 24 hours. 300 parts of water are added and the 2-propanol is evaporated. The product is extracted with chloroform. The extract is dried, filtered and evaporated. The residue is crystallized from diisopropylether, yielding 1-(methoxymethyl)-3-(4-piperidyl)-2-benzimidazolinone; mp. 110°C.

A mixture of 2.85 parts of 2-(epoxyethyl)-1,4-benzodioxane, 3.65 parts of 1-(methoxymethyl)-3-(4-piperidyl)-2-benzimidazolinone, 12 parts of benzene and 2.4 parts of methanol is stirred and refluxed for 3 hours. The reaction mixture is evaporated. The residue is converted into the hydrochloride salt in 2-propanol and diisopropylether. The crude salt is filtered off and crystallized from a mixture of 2-propanol and ethanol, yielding 1- 1-[2-1,4-benzodioxan-2-yl)-2-hydroxyethyl]-4-piperidyl -3-(methoxymethyl)-2-benzimidazolinone hydrochloride; mp. 228.4°C.

EXAMPLE X

A mixture of 14.5 parts of ethyl 4-(2-oxo-1-benzimidazolinyl)-1-piperidinecarboxylate, 1.9 parts of sodium hydride dispersion 73% and 100 parts of hexamethylphosphoramide is stirred for one hour at 60°C. After cooling, 13.8 parts of 2-methoxyethyl p-toluenesulfonate are added dropwise. Upon completion, stirring is continued: first overnight at 60°C and then for 6 hours at 80°C. The reaction mixture is cooled, poured onto water and the product is extracted with toluene. The extract is dried, filtered and evaporated, yielding ethyl 4-[3-(2-methoxyethyl)-2-oxo-1-benzimidazolinyl]-1-piperidinecarboxylate as an oily residue.

A mixture of 17.5 parts of ethyl 4-]3-(2-methoxyethyl)-2-oxo-1-benzimidazolinyl]-1-piperidinecarboxylate, 20 parts of potassium hydroxide, 128 parts of 2-propanol and 2.5 parts of water is stirred and refluxed for 24 hours. 300 parts of water are added and the 2-propanol is removed in vacuo. The product is extracted with chloroform. The extract is dried, filtered and evaporated. The residue is converted into the hydrochloride salt in diisopropylether and 2-propanol. The salt is filtered off and crystallized from a mixture of 2-propanol and ethanol, yielding 1-(2-methoxyethyl)-3-(4-piperidyl)-2-benzimidazolinone hydrochloride; mp. 241.4°C.

A mixture of 3.2 parts of 2-(epoxyethyl)-1,4-benzodioxane, 3.85 parts of 1-(2-methoxyethyl)-3-(4-piperidyl)-2-benzimidazolinone, 12 parts of benzene and 2.4 parts of methanol is stirred and refluxed for 3 hours. The reaction mixture is evaporated. The residue is converted into the hydrochloride salt in 2-propanol and diisopropylether. The salt is filtered off and crystallized from a mixture of 2-propanol and ethanol, yielding 1-{1-[2-(1,4-benzodioxan-2-yl)-2-hydroxyethyl]-4-piperidyl}-3-(2-methoxyethyl)-2-benzimidazolinone hydrochloride; mp. 234.8°C.

EXAMPLE XI

A mixture of 29 parts of ethyl 4-(2-oxo-1-benzimidazolinyl)-1-piperidinecarboxylate, 3.8 parts of sodium hydride dispersion 73% and 160 parts of hexamethylphosphoramide is stirred for one hour at 50°C. After cooling, 24 parts of β-bromophenetole are added dropwise. Upon completion, stirring is continued at 70°C for 20 hours. The reaction mixture is cooled, poured onto water and the product is extracted with toluene. The extract is dried, filtered and evaporated. The residue is crystallized from diisopropylether, yielding ethyl 4-[2-oxo-3-(2-phenoxyethyl)-1-benzimidazolinyl]-1-piperidinecarboxylate; mp. 96°C.

A mixture of 32 parts of ethyl 4-[2-oxo-3-(2-phenoxyethyl)-1-benzimidazolinyl]-1-piperidinecarboxylate, 40 parts of potassium hydroxide, 240 parts of 2-propanol and 5 parts of water is stirred and refluxed for 20 hours. The reaction mixture is cooled, 300 parts of water are added and the 2-propanol is evaporated. The product is extracted with toluene. The extract is dried, filtered and evaporated. The residue is converted into the hydrochloride salt in 2-propanol and diisopropylether. The salt is filtered off and crystallized from ethanol, yielding 1-(2-phenoxyethyl)-3-(4-piperidyl)-2-benzimidazolinone hydrochloride; mp. 246.3°C.

A mixture of 4.2 parts of 2-(epoxyethyl)-1,4-benzodioxane, 5.06 parts of 1-(2-phenoxyethyl)-3-(4-piperidyl)-2-benzimidazolinone, 14.4 parts of benzene and 2.4 parts of methanol is stirred and refluxed for 6 hours. The reaction mixture is evaporated. The residue is converted into the hydrochloride salt in 2-propanol and diisopropylether. The salt is filtered off and crystallized from a mixture of ethanol and methanol, yielding 1- 1-[2-(1,4-benzodioxan-2-yl)-2-hydroxyethyl]-4-piperidyl -3-(2-phenoxyethyl)-2-benzimidazolinone hydrochloride; mp. 242.2°C.

EXAMPLE XII

A mixture of 9.87 parts of 2-(2-chloroethoxy)tetrahydropyran, 1.9 parts of sodium hydride dispersion 73% and 100 parts of hexamethylphosphoramide is stirred at 60°C for 1 hour. After cooling, there are added dropwise 14.5 parts of ethyl 4-(2-oxo-1-benzimidazolinyl)-1-piperidinecarboxylate. Upon completion, stirring is continued for 24 hours at 75°C. The reaction mixture is cooled, poured onto water and the product is extracted with diisopropylether. The extract is dried, filtered and evaporated. The residue is crystallized from diisopropylether, yielding ethyl 4-{2-oxo-3-[2-(tetrahydropyran-2-yloxy)ethyl]-1-benzimidazolinyl}-1-piperidinecarboxylate; mp. 90°C.

A mixture of 14.5 parts of ethyl 4-{2-oxo-3-[2-(tetrahydropyran-2-yloxy)ethyl]-1-benzimidazolinyl}-1-piperidinecarboxylate, 0.8 parts of p-toluenesulfonic acid and 120 parts of ethanol is stirred and refluxed for 2 hours. The reaction mixture is evaporated, yielding ethyl 4-[3-(2-hydroxyethyl)-2-oxo-1-benzimidazolinyl]-1-piperidinecarboxylate as a residue.

A mixture of 11.65 parts of ethyl 4-[3-(2-hydroxyethyl)-2-oxo-1-benzimidazolinyl]-1-piperidinecarboxylate, 20 parts of potassium hydroxide, 128 parts of 2-propanol and 2.5 parts of water is stirred and refluxed for 24 hours. Water is added and the 2-propanol is evaporated. The residue is neutralized with acetic acid and the whole is evaporated again. The residue is alkalized with 100 parts of an ammonium hydroxide solution and the product is extracted with chloroform. The extract is dried, filtered and evaporated. The residue is converted into the hydrochloride salt in 2-propanol, yielding 1-(2-hydroxyethyl)-3-(4-piperidyl)-2-benzimidazolinone hydrochloride.

A mixture of 2.85 parts of 2-(epoxyethyl)-1,4-benzodioxane, 3.66 parts of 1-(2-hydroxyethyl)-3-(4-piperidyl)-2-benzimidazolinone, 13.5 parts of benzene and 2.4 parts of methanol is stirred and refluxed for 3 hours. The reaction mixture is evaporated. The residue is crystallized from ethanol. The crude product is filtered off and converted into the hydrochloride salt in a mixture of 2-propanol and diisopropylether. The crude salt is filtered off and crystallized from a mixture of ethanol and methanol, yielding, after drying, 1-{1-[2-(1,4-benzodioxan-2-yl)-2-hydroxyethyl]-4-piperidyl}-3-(2-hydroxyethyl)-2-benzimidazolinone hydrochloride; mp. 184°C.

EXAMPLE XIII

A mixture of 14.5 parts of ethyl 4-(2-oxo-1-benzimidazolinyl)-1-piperidinecarboxylate, 1.9 parts of sodium hydride dispersion 73% and 100 parts of hexamethylphosphoramide is stirred for 1 hour at 60°C. After cooling, there are added dropwise 11.1 parts of phenethyl bromide. Upon completion, stirring is continued overnight at 60°C. The reaction mixture is cooled, poured onto water and the product is extracted with toluene. The extract is dried, filtered and evaporated, yielding ethyl 4-(3-phenethyl-2-oxo-1-benzimidazolinyl)-1-piperidinecarboxylate as a residue.

A mixture of 19.5 parts of ethyl 4-(3-phenethyl-2-oxo-1-benzimidazolinyl)-1-piperdinecarboxylate, 20 parts of potassium hydroxide, 128 parts of 2-propanol and 2.5 parts of water is stirred and refluxed for 20 hours. The reaction mixture is cooled, 200 parts of water are added and the 2-propanol is evaporated. The product is extracted with chloroform. The extract is washed with water, dried, filtered and evaporated. The residue is converted into the hydrochloride salt in 2-propanol and diisopropylether. The salt is filtered off and crystallized from a mixture of 2-propanol and diisopropylether, yielding 1-phenethyl-3-(4-piperidyl)-2-benzimidazolinone hydrochloride; mp. 209.9°C.

A mixture of 3.2 parts of 2-(epoxyethyl)-1,4-benzodioxane, 4.8 parts of 1-phenethyl-3-(4-piperidyl)-2-benzimidazolinone, 14.4 parts of benzene and 2.4 parts of methanol is stirred and refluxed for 5 hours. The reaction mixture is evaporated. The residue is converted into the hydrochloride salt in 2-propanol and diisopropylether. The salt is filtered off and crystallized from a mixture of 2-propanol and ethanol, yielding 1-{1-[2-(1,4-benzodioxan-2-yl)-2-hydroxyethyl]-4-piperidyl}-3-phenethyl-2-benzimidazolinone hydrochloride; mp. 236.7°C.

EXAMPLE XIV

A mixture of 14.5 parts of ethyl 4-(2-oxo-1-benzimidazolinyl)-1-piperidinecarboxylate, 1.9 parts of sodium hydride dispersion 73% and 100 parts of hexamethylphosphoramide is stirred at 60°C for 1 hour. After cooling, there are added dropwise 10.26 parts of α-bromotoluene. Upon completion, stirring at 60°C is continued overnight. The reaction mixture is cooled, poured onto water and the product is extracted with toluene. The extract is dried, filtered and evaporated, yielding ethyl 4-(3-benzyl-2-oxo-1-benzimidazolinyl)-1-piperidinecarboxylate as an oily residue.

A mixture of 19 parts of ethyl 4-(3-benzyl-2-oxo-1-benzimidazolinyl)-1-piperidinecarboxylate, 20 parts of potassium hydroxide, 128 parts of 2-propanol and 2.5 parts of water is stirred and refluxed for 20 hours. The reaction mixture is cooled, 200 parts of water are added and the 2-propanol is removed in vacuo. The product is extracted with chloroform. The extract is washed with water, dried, filtered and evaporated. The residue is converted into the hydrochloride salt in 2-propanol and diisopropylether. The salt is filtered off and crystallized from a mixture of ethanol and methanol, yielding 1-benzyl-3-(4-piperidyl)-2-benzimidazolinone hydrochloride.

A mixture of 4.2 parts of 2-(epoxyethyl)-1,4-benzodioxane, 4.6 parts of 1-benzyl-3-(4-piperidyl)-2-benzimidazolinone, 14.4 parts of benzene and 2.4 parts of methanol is stirred and refluxed for 6 hours. The reaction mixture is evaporated. The residue is converted into the hydrochloride salt in 2-propanol and diisopropylether. The salt is filtered off and crystallized from a mixture of 2-propanol and ethanol, yielding 1-{1-[2-(1,4-benzodioxan-2-yl)-2-hydroxyethyl]-4-piperidyl}-3-benzyl-2-benzimidazolinone hydrochloride; mp. 255°–257°C.

EXAMPLE XV

To a stirred mixture of 15.5 parts of 1-(1-benzyl-4-piperidyl)-2-benzimidazolinone, 0.4 parts of Triton B and 45 parts of tetrahydrofuran is added dropwise a solution of 8.7 parts of methyl acrylate in 45 parts of tetrahydrofuran at 25°C. Upon completion, stirring is continued at room temperature for 24 hours. The reaction mixture is evaporated. The residue is converted into the hydrochloride salt in 2-propanol, yielding methyl 3-(1-benzyl-4-piperidyl)-2-oxo-1-benzimidazolidinepropionate hydrochloride; mp. 197.6°C.

A mixture of 16 parts of methyl 3-(1-benzyl-4-piperidyl)-2-oxo-1-benzimidazolidinepropionate hydrochloride and 280 parts of ethanol is hydrogenated at normal pressure and at a temperature of 30°C with 9 parts of palladium-on-charcoal catalyst 10%. After the calculated amount of hydrogen is taken up, the catalyst is filtered off and the filtrate is evaporated. The residue is crystallized from 2-propanol, yielding methyl 2-oxo-3-(4-piperidyl)-1-benzimidazolidinepropionate hydrochloride; mp. 189.5°C.

A mixture of 3.2 parts of 2-(epoxyethyl)-1,4-benzodioxane, 4.25 parts of methyl 2-oxo-3-(4-piperidyl)-1-benzimidazolidinepropionate, 12 parts of benzene and 2.4 parts of methanol is stirred and refluxed for 4 hours. The reaction mixture is evaporated. The residue is converted into the hydrochloride salt in 2-propanol and diisopropylether. The salt is filtered off and crystallized from methanol, yielding methyl 3-{1-[2-(1,4-benzodioxan-2-yl)-2-hydroxyethyl]-4-piperidyl}-2-oxo-1-benzimidazolidinepropionate hydrochloride; mp. 250.8°C.

EXAMPLE XVI

To a stirred and warm mixture of 78 parts of 1-(1-benzyl-4-piperidyl)-2-benzimidazolinone in 90 parts of tetrahydrofuran and 0.4 parts of Triton B is added dropwise a solution of 26.5 parts of acrylonitrile in 90 parts of tetrahydrofuran at 40°C. Upon completion, stirring is continued for 3h.30 at 45°C. The reaction mixture is poured onto water and the product is extracted with 4-methyl-2-pentanone. The layers are separated and the aqueous phase is extracted three times with 4-methyl-2-pentanone. The combined organic layers are washed with water, dried, filtered and evaporated. The residue is dissolved in benzene and the solution is diluted with petroleumether till turbid. The whole is filtered hot and the filtrate is allowed to crystallize while cooling and stirring. The precipitated product is filtered off (filtrate is set aside), yielding a first fraction of 3-(1-benzyl-4-piperidyl)-2-oxo-1-benzimidazolinepropionitrile; mp. 140°–141.4°C. The mother-liquor (filtrate which was set aside) is evaporated and the solid residue is crystallized from benzene, yielding a second fraction of 3-(1-benzyl-4-piperidyl)-2-oxo-1-benzimidazolinepropionitrile; mp. 131.2°–139°C.

To a solution of 32 parts of 3-(1-benzyl-4-piperidyl)-2-oxo-1benzimidazolinepropionitrile in 360 parts of methanol is added a suspension of 20 parts of palladium-on-charcoal catalyst 5% in 40 parts of 2-propanol. The whole is hydrogenated at normal pressure and at a temperature of about 40°C. After the calculated amount of hydrogen is taken up, hydrogenation is stopped. The catalyst is filtered off and the filtrate is evaporated. The residue is purified by columnchromatography, using a mixture of chloroform and 10% of methanol as eluent. The pure fractions are collected and the solvent is evaporated. The residue is converted into the hydrochloride salt in 2-propanol. The crude salt is filtered off and crystallized from methanol, yielding 2-oxo-3-(4-piperidyl)-1-benzimidazolinepropionitrile hydrochloride; mp. 168.4–267.4°C. (dec.).

A mixture of 2.85 parts of 2-(epoxyethyl)-1,4-benzodioxane, 3.8 parts of 2-oxo-3-(4-piperidyl)-1-benzimidazolinepropionitrile, 12 parts of benzene and 2.4 parts of methanol is stirred and refluxed for 3 hours. The reaction mixture is evaporated. The residue is converted into the hydrochloride salt in 2-propanol and diisopropylether. The salt is filtered off and crystallized twice: first from a mixture of 2-propanol and ethanol and then from ethanol, yielding 3-{1-[2-(1,4-benzodioxan-2-yl)-2-hydroxyethyl]-4-piperidyl}-2-oxo-1-benzimidazolinepropionitrile hydrochloride; mp. 227.6°C.

EXAMPLE XVII

A mixture of 14.5 parts of ethyl 4-(2-oxo-1-benzimidazolinyl)-1-piperidinecarboxylate, 1.9 parts of sodium hydride dispersion 73% and 100 parts of hexamethylphosphoramide is stirred for one hour at 60°C. Then there are added dropwise 9.5 parts of N-(2-chloroethyl)diethylamine. Upon completion, stirring is continued overnight at 80°C. The reaction mixture is cooled, poured onto ice-water and the product is extracted with toluene. The extract is washed with water, dried, filtered and evaporated, yielding ethyl 4-[3-(2-diethylaminoethyl)-2-oxo-1-benzimidazolinyl]-1-piperidinecarboxylate as an oily residue.

A mixture of 20 parts of ethyl 4-[3-(2-diethylaminoethyl)-2-oxo-1-benzimidazolinyl]-1-piperidinecarboxylate, 20 parts of potassium hydroxide, 128 parts of 2-propanol and 2.5 parts of water is stirred and refluxed for 24 hours. The reaction mixture is cooled and 300 parts of water are added. The 2-propanol is removed in vacuo and the product is extracted with chloroform. The extract is dried, filtered and evaporated. The residue is converted into the hydrochloride salt in 2-propanol, yielding 1-[2-(diethylamino)ethyl]-3-(4-piperidyl)-2-benzimidazolinone dihydrochloride; mp. 200°C.

A mixture of 3.2 parts of 2-(epoxyethyl)-1,4-benzodioxane, 4.4 parts of 1-[2-(diethylamino)ethyl]-3-(4-piperidyl)-2-benzimidazolinone, 12 parts of benzene and 2.4 parts of methanol is stirred and refluxed for 4 hours. The reaction mixture is evaporated. The residue is converted into the hydrochloride salt in 2-propanol and diisopropylether. The salt is filtered off and crystallized from a mixture of 2-propanol and ethanol, yielding 1- 1-[2-(1,4-benzodioxan-2-yl)-2-hydroxyethyl]-4-piperidyl -3-[2-(diethylamino)ethyl]-2-benzimidazolinone dihydrochloride; mp. 245.4°C.

EXAMPLE XVIII

A mixture of 14.5 parts of ethyl 4-(2-oxo-1-benzimidazolinyl-1-piperidinecarboxylate, 1.9 parts of sodium hydride dispersion 73% and 100 parts of hexamethylphosphoramide is stirred for 1 hour at 60°C. After cooling, 11.9 parts of 1-(2-chloroethyl)pyrrolidine hydrochloride are added dropwise. Upon completion, stirring is continued at 80°C for 24 hours. The reaction mixture is cooled, poured onto water and the product is extracted with toluene. The extract is dried, filtered and evaporated, yielding ethyl 4- 2-oxo-3-[2-(1-pyrrolidinyl)ethyl]-1-benzimidazolinyl -1-piperidinecarboxylate as an oily residue.

A mixture of 19.5 parts of ethyl 4-{2-oxo-3-[2-(1-pyrrolidinyl)ethyl]-1-benzimidazolinyl -1-} piperidinecarboxylate, 20 parts of potassium hydroxide, 128 parts of 2-propanol and 2.5 parts of water is stirred and refluxed for 24 hours. 300 parts of water are added, the 2-propanol is evaporated and the product is extracted with chloroform. The extract is washed with water, dried, filtered and evaporated. The residue is converted into the hydrochloride salt in diisopropylether and 2-propanol. The salt is filtered off and crystallized from ethanol, yielding 1-(4-piperidyl)-3-[2-(1-pyrrolidinyl)ethyl]-2-benzimidazolinone dihydrochloride; mp. >260°C.

A mixture of 2.85 parts of 2-(epoxyethyl)-1,4-benzodioxane, 4.4 parts of 1-(4-piperidyl)-3-[2-(1-pyrrolidinyl)ethyl]-2-benzimidazolinone, 12 parts of benzene and 2.4 parts of methanol is stirred and refluxed for 3 hours. The reaction mixture is evaporated. The residue is converted into the hydrochloride salt in 2-propanol and diisopropylether. The precipitated salt is filtered off and crystallized from ethanol, yielding 1-{1-[2-(1,4-benzodioxan-2-yl)-2-hydroxyethyl]-4-piperidyl}-3-[2-(1-pyrrolidinyl)-ethyl]-2-benzimidazolinone dihydrochloride; mp. 287.1°C.

EXAMPLE XIX

To a stirred mixture of 3.8 parts of sodium amide solution 75% and 100 parts of hexamethylphosphoramide are added portionwise 29 parts of ethyl 4-(2-oxo-1-benzimidazolinyl)-1-piperidinecarboxylate. After stirring at room temperature for one hour, there are added dropwise 14 parts of propargyl bromide. Upon completion, stirring at room temperature is continued overnight. The reaction mixture is poured onto ice-water and the product is extracted with toluene. The extract is dried, filtered and evaporated. The solid residue is crystallized from diisopropylether, yielding ethyl 4-[2-oxo-3-(2-propynyl)-1-benzimidazolinyl]-1-piperidinecarboxylate; mp. 135°C.

A mixture of 32 parts of ethyl 4-[2-oxo-3-(2-propynyl)-1-benzimidazolinyl]-1-piperidinecarboxylate, 40 parts of potassium hydroxide, 240 parts of 2-propanol and 5 parts of water is stirred and refluxed for 20 hours. The reaction mixture is cooled, 300 parts of water are added and the 2-propanol is evaporated. The product is extracted with chloroform. The extract is washed with water, dried, filtered and evaporated. The residue is converted into the hydrochloride salt in diisopropylether and 2-propanol. The salt is filtered off and crystallized from methanol, yielding 1-(2-oxopropyl)-3-(4-piperidyl)-2-benzimidazolinone hydrochloride; mp. > 260°C.

A mixture of 4.2 parts of 2-(epoxyethyl)-1,4-benzodioxane, 4.1 parts of 1-(2-oxopropyl)-3-(4-piperidyl)-2-benzimidazolinone, 14.4 parts of benzene and 2.4 parts of methanol is stirred and refluxed for 6 hours. The reaction mixture is evaporated. The residue is converted into the hydrochloride salt in diisopropylether and 2-propanol. The salt is filtered off and crystallized from a mixture of 2-propanol and ethanol, yielding 1-{1-[2-(1,4-benzodioxan-2-yl)-2-hydroxyethyl]-4-piperidyl}-3-(2-oxopropyl)-2-benzimidazolinone hydrochloride; mp. 248.6°C.

EXAMPLE XX

A mixture of 0.94 parts of 2-(epoxyethyl)-1,4-benzodioxane, 1.08 parts of 1-(1,2,3,6-tetrahydro-4-pyridyl)-2-benzimidazolinone, 5 parts of benzene and 1.2 parts of methanol is stirred and refluxed for 1h. 30. The reaction mixture is cooled and upon the addition of petroleumether, the product is separated as an oil.

The latter is washed with fresh petroleumether and then dissolved in chloroform. The solution is chromatographed over silicagel, using a mixture of chloroform and 10% of methanol as eluent. The pure fractions are collected and the solvent is evaporated. The residue is dissolved in acetone and after cooling the solution to 4°C overnight, the product is crystallized. It is filtered off, washed with acetone and dried in vacuo at 70°C, yielding 1-{1[2-(1,4-benzodioxan-2-yl)-2-hydroxyethyl]-1,2,3,6-tetrahydro-4-pyridyl}-2-benzimidazolinone; mp. 156.4°C.

EXAMPLE XXI

To a stirred and cooled (room temperature) solution of 1.17 parts of 1-(4-piperidyl)-2-benzimidazolinone in 24 parts of absolute ethanol are added first 2.85 parts of 1,4-benzodioxan-2-yl bromomethyl ketone and then 1 part of diisopropylamine. The whole is stirred for 5 minutes at room temperature. Water and methylene chloride are added and the layers are separated. The organic phase is washed 3 times with water, dried, filtered and evaporated. The residue is taken up in methanol and filtered over hyflo. The filtrate is evaporated and the residue is converted into the oxalate salt in methanol, yielding, after drying in vacuo at 50°C, (±)-1-{1-[2-(1,4-benzodioxan-2-yl)-2-oxoethyl]-4-piperidyl}-2-benzimidazolinone oxalate; mp. 173.5°C.

To a stirred and cooled (ice-bath) solution of 0.796 parts of (±)-1-{1-[2-(1,4-benzodioxan-2-yl)-2-oxoethyl]-4-piperidyl -2-benzimidazolinone in 6.4 parts of methanol are added portionwise, during a 1 hour-period, 0.147 parts of sodium borohydride. Upon completion, stirring is continued for 1 hour. The reaction mixture is evaporated. The residue is taken up in water and the product is extracted with methylene chloride. The organic layer is dried, filtered and evaporated. The residue is evaporated once more from ethyl acetate to remove the last traces of methylene chloride. The latter residue is crystallized from 2-propanol, yielding a mixture of erythro (±) and threo (±)-1—{-1-[-2-(1,4-benzodioxan-2-yl)-2-hydroxyethyl]-4-piperidyl}-2-benzimidazolinone; mp. 180°C.

EXAMPLE XXII

A sample of 15.5 parts of 1-{1-[2-(1,4-benzodioxan-2-yl)-2-hydroxyethyl]-4-piperidyl}-2-benzimidazolinone is subjected to a counter current distribution between a 1/1 by volume mixture of chloroform and an aqueous solution of 0.4M buffer pH 3.4 (citric acid/-secundary sodium phosphate). After 1600 transfer steps, the separation is complete, yielding two diastereoisomeric racemates with partition coefficients of $K_1$ = 1.25 (erythro 1-{1-[2-(1,4-benzolioxan-2-yl)-2-hydroxyethyl]-4-piperidyl}-2-benzimidazolinone — see Example II) and $K_2$ = 1.90 (threo 1-{1-[2-(1,4-benzodioxan-2-yl)-2-hydroxyethyl]-4-piperidyl -2-benzimidazolinone), respectively.

The latter is evaporated and the residue is converted into the cyclohexanesulfamate salt in acetone, yielding threo 1-ι1-[2-(1,4-benzodioxan-2-yl)-2-hydroxyethyl]-4-piperidyl}-2-benzimidazolinone cyclohexanesulfamate; mp. 255.3°C.

EXAMPLE XXIII

A sample of 2.5 parts of 1-{1-[2-(1,4-benzodioxan-2-yl)-2-hydroxyethyl]-4-piperidyl}-3-methyl-2-benzimidazolinone hydrochloride is subjected to a counter current distribution between a 1/1 by volume mixture of chloroform and an aqueous solution of 0.4M buffer pH 3.4 (citric acid/secundary sodium phosphate). After 1277 transfer steps, the separation is complete, yielding the two diastereoisomeric racemates with partition coefficients of $K_1$ = 0.17 (erythro 1-{1-[2-(1,4-benzodioxan-2-yl)-2-hydroxyethyl]-4-piperidyl -3- } methyl-2-benzimidazolinone hydrochloride) and $K_2$ = 0.29 (threo 1-{1-[2-(1,4-benzodioxan-2-yl)-2-hydroxyethyl]-4-piperidyl}-3-methyl-2-benzimidazolinone hydrochloride), respectively. The two diastereoisomeric racemates are treated separatly as follows:

The mixture is alkalized with sodium hydroxide solution 60%. The organic layer is separated, dried, filtered and evaporated. The residue is converted into the hydrochloride salt in 2-propanol and diisopropylether, yielding:
  1° erythro 1-{1-[2-(1,4-benzodioxan-2-yl)-2-hydroxyethyl]-4-piperidyl}-3-methyl-2-benzimidazolinone hydrochloride; mp. 257°–260.5°C.; and
  2° threo 1-{1-[2-(1,4-benzodioxan-2-yl)-2-hydroxyethyl]-4-piperidyl}-3-methyl-2-benzimidazolinone hydrochloride; mp. 265.5°–268.5°C.

EXAMPLE XXIV

By repeating the procedure of Example XXI and by replacing the 1-(4-piperidyl)-2-benzimidazolinone used therein by an equivalent amount of an appropriately substituted 1-(4-piperidyl)-2-benzimidazolinone, the following compounds of formula (I) are obtained:
1-{1-[2-(1,4-benzodioxan-2-yl)-2-hydroxyethyl]-4-piperidyl}-5-methyl-2-benzimidazolinone;
1-{1-[2-(1,4-benzodioxan-2-yl)-2-hydroxyethyl]-4-piperidyl}-5,6-dichloro-2-benzimidazolinone;
1-{1-[2-(1,4-benzodioxan-2-yl)-2-hydroxyethyl]-4-piperidyl}-5,6-dimethyl-2-benzimidazolinone;
1-{1-[2-(1,4-benzodioxan-2-yl)-2-hydroxethyl]-4-piperidyl}-5-chloro-6-methyl-2-benzimidazolinone; and
1-{1-[2-(1,4-benzodioxan-2-yl)-2-hydroxethyl]-4-piperidyl}-5-fluoro-2-benzimidazolinone.

EXAMPLE XXV

When the procedure of Example XX is repeated except that the 1-(1,2,3,6-tetrahydro-4-pyridyl)-2-benzimidazolinone used therein is replaced by an equivalent amount of an appropriately substituted 1-(1,2,3,6-tetrahydro-4-pyridyl)-2-benzimidazolinone, the following compounds of formula (I) are obtained:
1- 1-[2-(1,4-benzodioxan-2-yl)-2-hydroxyethyl]-1,2,3,6-tetrahydro-4-pyridyl -3-methyl-2-benzimidazolinone;
1- 1-[2-(1,4-benzodioxan-2-yl)-2-hydroxethyl]-1,2,3,6-tetrahydro-4-pyridyl -3-ethyl-2-benzimidazolinone;
1- 1-[21(1,4-benzodioxan-2-yl)-2-hydroxyethyl]-1,2,3,6-tetrahydro-4-pyridyl -3-(1-methoxyethyl)-2-benzimidazolinone; and
1-{1-[2-(1,4-benzodioxan-2yl)-2-hydroxyethyl]-1,2,3,6-tetrahydro-4-pyridyl}-3-(2-oxopropyl)-2-benzimidazolinone.

EXAMPLE XXVI

When the procedure of Example XVIII is repeated except that an equivalent amount of 1-(2-chloroethyl)-piperidine is used instead of the 1-(2-chloroethyl)pyrrolidine used therein, the compound 1-{1-[2-(1,4-benzodioxan-2-yl)-2-hydroxyethyl]-4-piperidyl}-3-[2-(1-piperidyl)ethyl]-2-benzimidazolinone is obtained as an end-product.

We claim:
1. A compound selected from the group of benzimidazolinone derivatives having the formula

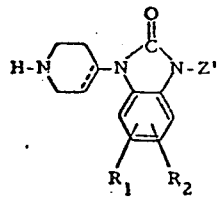

wherein:
Z' is a member selected from the group consisting of lower alkenyl, phenoxy-loweralkyl, phenyl-loweralkyl, di-loweralkyl-aminoloweralkyl and cyclic loweralkyleneamino-loweralkyl;

$R_1$ and $R_2$ are each a member selected from the group consisting of hydrogen, halo and loweralkyl; and the dotted line indicates an optional double bond.

2. 1-Allyl-3-(4-piperidyl)-2-benzimidazolinone.
3. 1-(2-Phenoxyethyl)-3-(4-piperidyl)-2-benzimidazolinone.
4. 1-Phenethyl-3-(4-piperidyl)-2-benzimidazolinone.
5. 1-Benzyl-3-(4-piperidyl)-2-benzimidazolinone.
6. 1-[2-(Diethylamino)ethyl]-3-(4-piperidyl)-2-benzimidazolinone.
7. 11(4-Piperidyl)-3-[2-(1-pyrrolidinyl)ethyl]-2-benzimidazolinone.

* * * * *

UNITED STATES PATENT AND TRADEMARK OFFICE
CERTIFICATE OF CORRECTION

PATENT NO. : 3,929,801
DATED : December 30, 1975
INVENTOR(S) : Janssen et al.

It is certified that error appears in the above-identified patent and that said Letters Patent are hereby corrected as shown below:

Abstract - "{1-1-[2 " should read "1-{1-[2"
In Column 10, line 6, "1-pyrrondinyl-loweralyl" should read --- 1-pyrrolidinyl-loweralkyl ---
In Column 12, line 4, "'(+) " should read --- (+) ---
In Column 12, line 11, "(+) " Should read --- (-) ---
In Column 13, line 24, "ttaken" should read ---taken---
In Column 17, line 4, "1- 1-[2" should read---1- {1-[2 ---
In Column 17, line 5, "-4-piperidyl" should read --- -4-piperidyl} -----
In Column 17, line 22, "4-]'" should read --- 4-[ ---
In Column 18, line 13, "1- 1-[2" should read ---1- {1-[2 ---
In Column 18, line 14, "-4-piperidyl" should read --- -4-piperidyl} -----
In Column 21, line 51, "1- 1-[2" should read --- 1- {1-[2 ---
In Column 21, line 52, "-4-piperidyl" should read --- -4-piperidyl} -----
In Column 21, line 65 "4- 2" should read "4- {2"
In Column 21, line 66, "benzimidazolinyl -1" should read ---benzimidazolinyl} -1 -----

UNITED STATES PATENT AND TRADEMARK OFFICE
CERTIFICATE OF CORRECTION

PATENT NO. : 3,929,801
DATED : December 30, 1975
INVENTOR(S) : Janssen et al.

It is certified that error appears in the above-identified patent and that said Letters Patent are hereby corrected as shown below:

In Column 23, line 16, "1.17 parts" should read --- 2.17 parts ----
In Column 23, line 54, "benzolioxan" should read ---benzodioxan---
In Column 23, line 57, "piperidyl -" should read --- piperidyl} - ----
In Column 23, line 61, "1- ,1" should read --"1- {1" ---
In Column 24, line 8, "-4-piperidyl-3-" should read "-4-piperidyl} -3-"
In Column 24, line 50, "1- 1" should read "1- {1"
In Column 24, line 51, "pyridyl -3" should read "pyridyl} -3"
In Column 24, line 53, "1- 1" should read "1- {1"
In Column 24, line 54, "pyridyl -3" should read "pyridyl} -3"
In Column 24, line 56, "1- 1" should read "1- {1"
In Column 24, line 57, "pyridyl -3" should read "pyridyl} -3"
In Column 26, line 14, "11(4-" should read "1-(4-"

Signed and Sealed this

Fourteenth Day of February 1978

[SEAL]

Attest:

RUTH C. MASON
Attesting Officer

LUTRELLE F. PARKER
Acting Commissioner of Patents and Trademarks